United States Patent
Kaneshiro et al.

(10) Patent No.: US 9,937,467 B2
(45) Date of Patent: Apr. 10, 2018

(54) EXHAUST GAS PROCESSING DEVICE

(71) Applicant: KANKEN TECHNO CO., LTD., Nagaokakyo-shi, Kyoto (JP)

(72) Inventors: Hiroaki Kaneshiro, Nagaokakyo (JP); Hideki Okamoto, Nagaokakyo (JP); Osamu Hamakawa, Nagaokakyo (JP); Shunsuke Yanai, Nagaokakyo (JP); Hiroshi Imamura, Nagaokakyo (JP)

(73) Assignee: KANKEN TECHNO CO., LTD., Kyoto (JP)

( * ) Notice: Subject to any disclaimer, the term of this patent is extended or adjusted under 35 U.S.C. 154(b) by 0 days.

(21) Appl. No.: 15/516,799

(22) PCT Filed: Oct. 6, 2014

(86) PCT No.: PCT/JP2014/005088
§ 371 (c)(1),
(2) Date: Apr. 4, 2017

(87) PCT Pub. No.: WO2016/056036
PCT Pub. Date: Apr. 14, 2016

(65) Prior Publication Data
US 2017/0320012 A1    Nov. 9, 2017

(51) Int. Cl.
*B01D 53/76*  (2006.01)
*B01D 53/70*  (2006.01)
(Continued)

(52) U.S. Cl.
CPC ............ *B01D 53/76* (2013.01); *B01D 47/06* (2013.01); *B01D 51/10* (2013.01); *B01D 53/70* (2013.01);
(Continued)

(58) Field of Classification Search
None
See application file for complete search history.

(56) References Cited

U.S. PATENT DOCUMENTS

2004/0191146 A1*  9/2004  Shinohara .......... B01D 53/1456
                                                            423/240 R

FOREIGN PATENT DOCUMENTS

JP      07-323211 A     12/1995
JP      09-280540 A     10/1997
(Continued)

OTHER PUBLICATIONS

Kato et al. JP2008-194674A—translated document (2008).*
International Search Report dated Dec. 22, 2014 for Application No. PCT/JP2014/005088 and English translation.

*Primary Examiner* — Walter D. Griffin
*Assistant Examiner* — Jelitza M Perez
(74) *Attorney, Agent, or Firm* — Lucas & Mercanti, LLP (57) ABSTRACT

An exhaust gas processing device preheats processing target exhaust gas in the presence of moisture with heat from at least either an electric heater or a heat exchanger and subsequently thermally decomposes the exhaust gas with an atmospheric pressure plasma. A device main body has a heating decomposition chamber therein. A plasma generator is installed at a top surface portion of the device main body. A reactor has a cylindrical shape and is installed within the device main body such that an upper end opening thereof is directed toward a plasma emission port of the plasma generator. A moisture supply unit is provided at an inlet side of the device main body. At least either the electric heater or the heat exchanger is disposed in a first space.

6 Claims, 7 Drawing Sheets

(51) Int. Cl.
*B01D 51/10* (2006.01)
*B01D 47/06* (2006.01)
*F23G 7/06* (2006.01)

(52) U.S. Cl.
CPC ...... *F23G 7/063* (2013.01); *B01D 2257/2066* (2013.01); *B01D 2259/122* (2013.01); *B01D 2259/818* (2013.01)

(56) References Cited

FOREIGN PATENT DOCUMENTS

| | | | |
|---|---|---|---|
| JP | 2000039136 A | | 2/2000 |
| JP | 2000334294 A | | 12/2000 |
| JP | 2008194674 A | * | 8/2008 |
| JP | 2013202422 A | | 10/2013 |
| WO | 2008136217 A1 | | 11/2008 |

* cited by examiner

EXHAUST GAS PROCESSING DEVICE

CROSS REFERENCE TO RELATED APPLICATION

This Application is a 371 of PCT/JP2014/005088 filed on Oct. 6, 2014, which is incorporated herein by reference.

TECHNICAL FIELD

The present invention relates to a device for decomposing gases including gas harmful to a human body, global warming gas, ozone layer-depleting gas, etc., in particular, gas discharged from a process for producing a semiconductor, liquid crystal, or the like.

BACKGROUND ART

At present, a wide variety of industrial processes for producing or processing objects have been developed and carried out, and the types of gases discharged from such a wide variety of industrial processes (hereinafter, referred to as "processing target exhaust gas") are also very diverse. Thus, various types of gas processing methods and exhaust gas processing devices are selectively used according to the types of processing target exhaust gas discharged from industrial processes.

For example, in a semiconductor production process, various kinds of gases are used, such as monosilane ($SiH_4$), chloride gas, PFC (perfluorinated compounds: $CF_4$, $SF_6$, $C_4F_8$, $NF_3$, $C_5F_8$, $C_4F_6$, $C_2F_6$, $C_3F_8$, $C_3F_6$, $CH_2F_2$, $CHF_3$, etc., those compounds have a great impact on the global environment, since the global warming potential (GWP) values thereof are higher by several thousand times to several ten thousand times than that of $CO_2$ and thus very high, and the atmospheric lifetimes thereof are also longer by several thousand times to several ten thousand times than that of $CO_2$ and thus very long). In the case where monosilane is included in the processing target exhaust gas, a processing device such as a pyrolysis type, a combustion type, an adsorption type, or a chemical reaction type is used. In the case where chloride gas is included in the processing target exhaust gas, a processing device such as a wet type using a chemical solution, or an adsorption type is used. In addition, in the case where PFC is included in the processing target exhaust gas, an exhaust gas processing device such as a catalyst type, a thermal reaction type, a pyrolysis type, a combustion type, or a plasma type is used.

When exhaust gas processing devices are respectively prepared according to various types of processing target exhaust gas discharged from industrial processes as described above, management of such devices becomes complicated for a user, and the time and cost required for maintenance of the devices increase. This consequently have a rebound effect on the cost of the product, leading to a decrease in cost competitiveness of the product.

Many types of the processing target exhaust gas discharged from industrial processes can be thermally decomposed under high temperature. Thus, when a pyrolysis type exhaust gas processing device disclosed in Patent Literature 1 is used, that is, a device is used which performs decomposition processing by emitting an atmospheric pressure plasma into a reactor and supplying processing target exhaust gas toward the atmospheric pressure plasma, at least a processing target exhaust gas that can be thermally decomposed under high temperature can be decomposed with one device regardless of the type of the processing target exhaust gas. In the present specification, "atmospheric pressure plasma" is a plasma generated under an atmospheric pressure condition, and means plasma in a broad sense including thermal plasma, microwave plasma, and flame.

CITATION LIST

Patent Literature

[PTL 1] Japanese Laid-Open Patent Publication No. 2000-334294

SUMMARY OF INVENTION

Technical Problem

The pyrolysis type exhaust gas processing device using an atmospheric pressure plasma as described above easily achieves a high temperature such as 1500° C. Thus, the pyrolysis type exhaust gas processing device can thermally decompose not only exhaust gas components that are decomposed at low temperature and can be processed at a normal temperature of 800 to 900° C. but also PFC which is most difficult to decompose, so that the pyrolysis type exhaust gas processing device has very high versatility. Meanwhile, a semiconductor production device has been increased in size for increasing the efficiency. On the other hand, integration of existing facilities is required for processing a large amount of exhaust gas with a single exhaust gas processing device. Accordingly, the flow volume of PFC which is a problem increases dramatically.

As a matter of course, the exhaust gas processing device that is required to handle this is required to have enhanced capability of processing with the atmospheric pressure plasma.

At present, the capability of processing with the atmospheric pressure plasma is low, and thus it is possible to handle the case where the flow rate of PFC is 100 L/min (liters per minute) or less and is low. However, when the flow rate of PFC is increased, particularly becomes equal to or greater than 250 L/min, the amount of current applied to a plasma torch increases accordingly, so that the running cost rapidly increases and the lifetime of the torch also rapidly decreases. Due to such problems, the above requirement has not been fulfilled.

Therefore, a main object of the present invention is to provide a novel exhaust gas processing device that mainly uses an atmospheric pressure plasma for processing target exhaust gas including a large amount of PFC increased as described above, and that preheats the increased PFC in the sent processing target exhaust gas by using any one of or both an electric heater and a heat exchanger (also including a heat pump) at a stage previous to the atmospheric pressure plasma, and rapidly heats the preheated PFC to a decomposition temperature with the atmospheric pressure plasma, to save the energy for the preheating and reduce the load on a plasma torch, thereby allowing for handling processing target exhaust gas having a large flow volume and including a large amount of PFC.

Solution to Problem

An exhaust gas processing device 10 according to claim 1 is an exhaust gas processing device 10 for preheating externally-supplied processing target exhaust gas F within a device main body 11 in the presence of moisture with heat from at least either an electric heater 15 or a heat exchanger 17, and subsequently thermally decomposing the preheated exhaust gas with an atmospheric pressure plasma P, the exhaust gas processing device 10 including:

the device main body 11 having a heating decomposition chamber T therein;

a non-transferred type plasma generator 14 installed at a top surface portion 11a of the device main body 11;

a tubular reactor 12 installed within the device main body 11 such that an upper end opening 12i thereof is directed toward a plasma emission port 14f of the plasma generator 14, the reactor 12 having therein a second space T2 in which a high-temperature decomposable gas component of the processing target exhaust gas F is thermally decomposed with an atmospheric pressure plasma P from the plasma generator 14;

a moisture supply unit 18 provided at an inlet side of the device main body 11 and configured to supply moisture to the heating decomposition chamber T; and at least either the heat exchanger 17 or the electric heater disposed in a first space T1 which is between an inner peripheral surface of the device main body 11 and an outer peripheral surface of the reactor 12 and into which the processing target exhaust gas F is supplied, the heat exchanger 17 being configured to transfer heat in the second space T2 to the first space T1, wherein the reactor 12 has a cylindrical shape whose both end surfaces are open, and includes a center portion which is narrowed and is a small-diameter trunk portion 12b at a center thereof, a high-temperature reaction portion 12a above the small-diameter trunk portion 12b at the center, and a high-temperature exhaust portion 12c below the small-diameter trunk portion 12b at the center, and the heat exchanger 17 is provided at the high-temperature exhaust portion 12c.

In the case with the processing target exhaust gas F which mainly includes a high-temperature decomposable gas component such as PFC, first, the processing target exhaust gas F: is preheated in the first space T1 by the electric heater 15 installed in the first space T1 or by high heat of the second space T2 kept at a high temperature by the atmospheric pressure plasma P, the high heat being transferred to the first space T1 by the heat exchanger 17; is subsequently drawn into the second space T2; and is thermally decomposed with the atmospheric pressure plasma P therein. At this time, the amount of heat required for reaching the decomposition temperature of the high-temperature decomposable gas component to be processed with the atmospheric pressure plasma P is reduced by an amount corresponding to the preheating. In other words, even when the flow volume of the high-temperature decomposable gas such as PFC is large, the required capacity of the plasma generator 14 is reduced by an amount corresponding to the preheating.

In addition, the processing target exhaust gas F may include not only a high-temperature decomposable gas component such as PFC but also a low-temperature decomposable gas component. Also in this case, first, the low-temperature decomposable gas component is decomposed in the first space T1 by the heat exchanger 17 or the electric heater 15 installed in the first space T1, and the high-temperature decomposable gas component such as PFC is also preheated to the atmospheric temperature of the first space T1 at the same time. As a result, even in the case where the high-temperature decomposable gas component is thermally decomposed in the second space T2 with the atmospheric pressure plasma P as described above, the required capacity of the plasma generator 14 is reduced by an amount corresponding to the preheating.

As described above, even when the flow volume of the high-temperature decomposable gas component of the processing target exhaust gas F becomes large, the required capacity of the atmospheric pressure plasma P suffices to be a small capacity which is the capacity in the conventional art. The heat exchanger 17 includes a type in which a high-temperature gas and a low-temperature gas are caused to flow adjacently with a partition wall interposed therebetween, thereby transferring heat from the high-temperature side to the low-temperature side, and also a device such as a heat pump in which heat is transferred from a high-temperature portion to a low-temperature portion by using a heat medium. In the present invention, the plasma generator 14 is essential, but only either of the electric heater 15 or the heat exchanger 17 may be included, or the electric heater 15 and the heat exchanger 17 may be used in combination.

In claim 2, in the exhaust gas processing device 10 according to claim 1, the moisture supply unit 18 is a pre-stage wet scrubber 18A provided at the inlet side of the device main body 11 and configured to wash the processing target exhaust gas F with water. In this case, when the low-temperature processing target exhaust gas F includes dust and the like, the dust and the like are collected by sprayed water W of the scrubber 18A, and the low-temperature processing target exhaust gas F flows toward the next step. At the same time, moisture required for thermal decomposition is supplied to the processing target exhaust gas F.

In claim 3, in the exhaust gas processing device 10 according to claim 1, the moisture supply unit 18 is a vapor supply device 18B provided at the inlet side of the device main body 11 and configured to supply vapor to the device main body 11. In this case, when the low-temperature processing target exhaust gas F includes dust and the like, the vapor aggregates to the dust to collect the dust. At the same time, similarly as described above, moisture required for thermal decomposition is supplied to the processing target exhaust gas F.

In claim 4, in the exhaust gas processing device 10 according to any one of claims 1 to 3, a fin 12F for dissipating heat of the reactor 12 into the first space T1 is provided on the outer peripheral surface of the reactor 12.

In claim 5, the exhaust gas processing device 10 according to any one of claims 1 to 4, a post-stage wet scrubber 22 configured to wash the processed exhaust gas G discharged from the reactor 12, with water is further provided.

As described above, in the present invention, by providing either the electric heater 15 or the heat exchanger 17 or both the electric heater 15 and the heat exchanger 17 at the plasma generator 14, the high-temperature decomposable gas component such as PFC in the processing target exhaust gas F is preheated in the first space T1. Thus, the load on the plasma generator 14 is reduced by an amount corresponding to the preheating, and an increase in the amount of the high-temperature decomposable gas component can be handled by the plasma generator 14 having a small capacity.

In addition, in the case where the processing target exhaust gas F is composed of low/high-temperature decomposable gas components, the low-temperature thermally decomposable gas component which is decomposed at approximately 800 to 1000° C. is processed by the electric heater 15 or the heat exchanger 17 in advance, and the component such as PFC which is most difficult to decompose is preheated to the atmospheric temperature at the same time. Thus, for example, exhaust gas having a large flow volume of 250 L/min is enabled to be processed without enhancing the processing capability of the plasma torch 14a similarly as described above.

DESCRIPTION OF EMBODIMENTS

Figure 1:
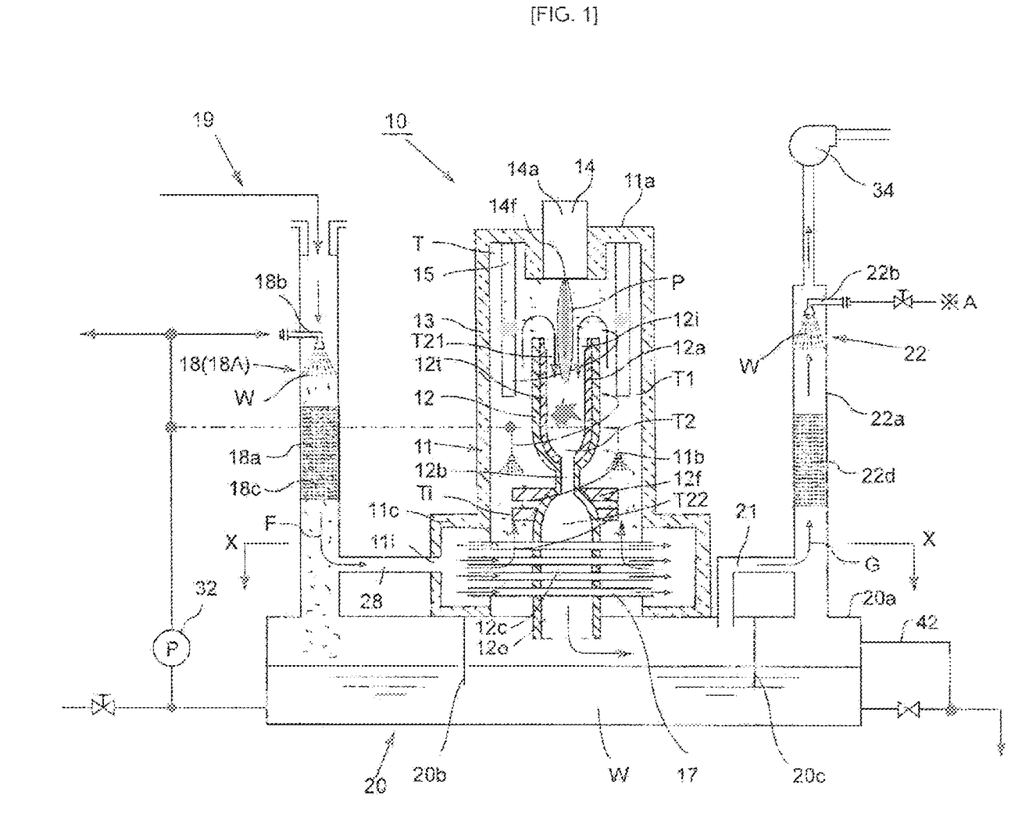
FIG. 1 is a configuration diagram showing an exhaust gas processing device of a first embodiment of the present invention.

Hereinafter, the present invention will be described by means of illustrated embodiments. FIG. 1 is a configuration diagram showing an outline of an exhaust gas processing device 10 of a first embodiment. As shown in FIG. 1, the exhaust gas processing device 10 of the present embodiment generally includes a device main body 11, a reactor 12, a plasma generator 14, a moisture supply unit 18, electric heaters 15 and a heat exchanger 17 (FIG. 1 shows an example in which both the electric heaters 15 and the heat exchanger 17 are installed, but at least either the electric heaters 15 or the heat exchanger 17 is installed), a water tank 20, and a post-stage wet scrubber 22, etc. In the present specification, components having the same functions are designated by the same reference signs, and, for simplification, a second embodiment and subsequent embodiments employ the descriptions in the first embodiment in principle and such descriptions are omitted therein. In the first embodiment shown in FIG. 1, a description will be given with the example in which both the electric heaters 15 and the heat exchanger 17 are installed, but only either of the electric heaters 15 or the heat exchanger 17 may be included.

The device main body 11 is a cylindrical container having a closed top surface portion 11a, and the outer peripheral surface thereof is covered with a heat insulator 13. A plasma torch 14a of the plasma generator 14 is installed at the top surface portion 11a, and has a plasma emission port 14f which is provided so as to be open downward from the center of the top surface portion 11a of the device main body 11. A lower portion of the device main body 11 bulges toward the outer peripheral side in a donut shape (as a matter of course, the device main body 11 may have a straight tube shape in which the lower portion does not bulge), and this portion 11c (hereinafter, referred to as annular bulge portion 11c) is provided with an introduction port 11i for processing target exhaust gas F with moisture. The device main body 11 is provided upright at the center of a top surface portion 20a of the water tank 20 described later. The reactor 12 is provided upright at the center of the interior of the device main body 11, a discharge port 12o for processed exhaust gas G which is an opening of a lower surface of the reactor 12 is inserted into the water tank 20 through a through hole which is provided at the center of the top surface portion 20a of the water tank 20.

The reactor 12 is provided upright along the center of the device main body 11, a ring-shaped space between the outer peripheral surface of the reactor 12 and the inner peripheral surface of the device main body 11 is referred to as first space T1, and the interior of the reactor 12 is referred to as second space T2.

A plurality of (here, four) electric heaters 15 are hung from the top surface portion 11a of the device main body 11 and are located in an upper portion of the first space T1. Meanwhile, the second space T2 is the interior of the reactor 12, the upper end of the first space T1 and an upper end portion of the second space T2 are connected to each other, and the upper end portion of the second space T2 is kept at a high temperature (e.g., 800 to 900° C., or a temperature close to 1000° C.) by heating of the electric heaters 15.

The reactor 12 has a cylindrical shape whose both end surfaces are open, and a center portion thereof is narrowed. The narrowed center portion of the reactor 12 is referred to as small-diameter trunk portion 12b, a portion of the reactor 12 above the small-diameter trunk portion 12b is referred to as high-temperature reaction portion 12a, and a portion of the reactor 12 below the small-diameter trunk portion 12b is referred to as high-temperature exhaust portion 12c. An upper end opening 12i of the reactor 12 is provided so as to be open toward the plasma emission port 14f. The inner diameter of each of the high-temperature reaction portion 12a and the high-temperature exhaust portion 12c is set to be larger than the inner diameter of the small-diameter trunk portion 12b. The space within the high-temperature reaction portion 12a is referred to as high-temperature reaction space T21 of the second space T2, and the space within the high-temperature exhaust portion 12c is referred to as high-temperature exhaust space T22. A refractory material 12t is thickly applied to the inner peripheral surface of the high-temperature reaction portion 12a. The reactor 12 is formed from a heat-resistant alloy or thick-walled cast iron.

A bottom portion of the high-temperature reaction portion 12a which is connected to the small-diameter trunk portion 12b is formed in a circular arc shape such as a spheroid or a paraboloid. Meanwhile, a large number of fins 12f are integrally provided on the outer peripheral surface of the high-temperature exhaust portion 12c so as to project therefrom. The fins 12f serve to efficiently dissipate heat of the high-temperature exhaust portion 12c to the first space T1, and are not essential but provided as necessary.

The heat exchanger 17 may be any device as long as the device transfers the heat of the high-temperature exhaust portion 12c to the first space T1. Here, for example, the heat exchanger 17 is composed of a large number of heat-resistant pipes which are inserted through a large number of through holes which are formed in the high-temperature exhaust portion 12c in multiple rows and multiple columns at predetermined intervals. An inlet portion and an outlet portion of each heat-resistant pipe project and are open in the annular bulge portion 11c, part (or all) of the low-temperature processing target exhaust gas F introduced from the introduction port 11i into the annular bulge portion 11c is caused to flow through the heat-resistant pipes and is heated by the high-temperature processed exhaust gas G flowing in a lower portion of the high-temperature exhaust portion 12c. Meanwhile, in the high-temperature exhaust portion 12c, the high-temperature processed exhaust gas G flows between the heat-resistant pipes to heat the low-temperature processing target exhaust gas F flowing through the heat-resistant pipes.

Figure 2:
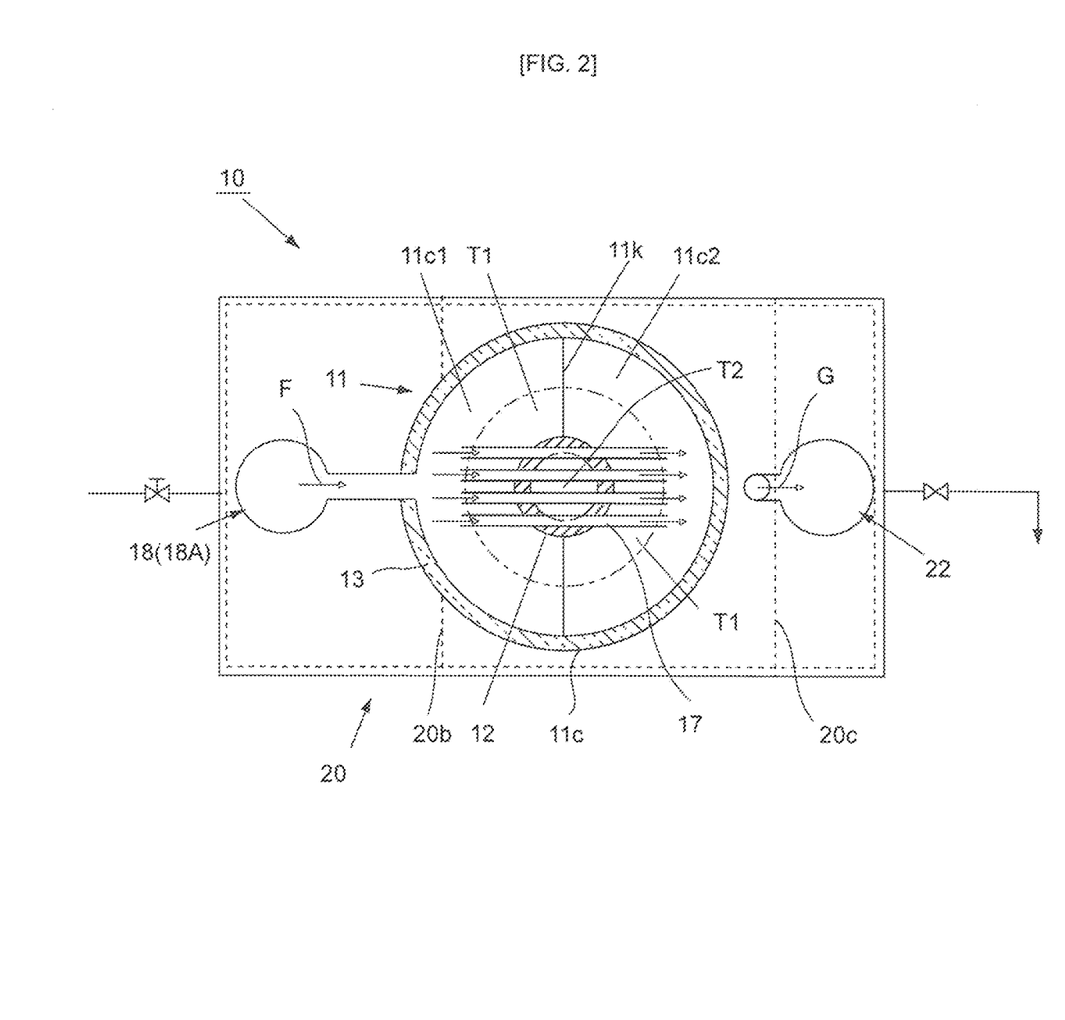
FIG. 2 is a cross-sectional view taken along arrow X-X in FIG. 1.

As shown in FIG. 2, within the annular bulge portion 11c, a partition wall 11k is provided between the device main body 11 and the reactor 12, so that part (or all) of the low-temperature processing target exhaust gas F easily flows from a space 11c1 at the introduction port 11i side to a space 11c2 at the opposite side. In the case of causing all the low-temperature processing target exhaust gas F to flow from the space 11c1 to the space 11c2 at the opposite side, although not shown, the boundary between the space 11c1 at the introduction port 11i side and the first space T1 may be closed to allow the low-temperature processing target exhaust gas F to flow into the first space T1 only from the space 11c2 at the opposite side. The heat exchanger 17 is not limited to the above-described structure, and may be composed of a heat pump instead of the heat-resistant pipes. In this case, the heat of the high-temperature processed exhaust gas G flowing in the lower portion of the high-temperature exhaust portion 12c is taken and transferred to a portion which projects from the high-temperature exhaust portion 12c to the first space T1, and the low-temperature processing target exhaust gas F comes into contact with and is heated by the projecting portion whose temperature has become high.

The plasma generator 14 includes: the plasma torch 14a which includes therein electrodes which generate a high-temperature atmospheric pressure plasma P; a DC power supply (not shown) which applies a potential to the electrodes of the plasma torch 14a; and a working gas supply device (not shown) which supplies a working gas to the plasma torch 14a. The plasma torch 14a is mounted at a center portion of the top surface portion 11a of the device main body 11 such that the atmospheric pressure plasma P can be emitted from the plasma emission port 14f toward the interior of the reactor 12.

The DC power supply serves to apply a predetermined discharge voltage to a pair of the electrodes provided within the plasma torch 14a, to generate a plasma arc between the electrodes. In the present embodiment, a so-called switching type power supply device is used.

The working gas supply device serves to feed the working gas such as nitrogen, hydrogen, or argon to the plasma torch 14a and includes: a storage tank (not shown) which stores the working gas; and a working gas supply pipe (not shown) which provides communication between the storage tank and the plasma torch 14a.

The working gas supply device of the present embodiment is provided with weight/flow rate control means on the working gas supply pipe. The weight/flow rate control means serves to control the amount of the working gas supplied to the plasma torch 14a through the working gas supply pipe to be constant.

As the moisture supply unit 18, a pre-stage wet scrubber 18A is used in the first embodiment. Hereinafter, a description will be given with the moisture supply unit 18 being the pre-stage wet scrubber 18A. The pre-stage wet scrubber 18A serves to spray water (i.e., moisture) W to the processing target exhaust gas F supplied from an exhaust gas duct 19 which is connected to a processing target exhaust gas generation source (not shown), to remove solid components and water-soluble components from the processing target exhaust gas F through water washing.

The upper end of a straight-tube scrubber main body 18a is connected to the exhaust gas duct 19, and the scrubber main body 18a is provided upright such that the lower end thereof is located at one end portion of the top surface portion 20a of the water tank 20. The lower surface of the scrubber main body 18a is open within the water tank 20. An exhaust gas introduction pipe 28 connected to the introduction port 11i of the annular bulge portion 11c is connected to the side surface of a lower portion of the scrubber main body 18a. A spray nozzle 18b is installed within the scrubber main body 18a, and the water (i.e., moisture) W or a chemical solution pumped by a water pump 32 is sprayed therefrom. A filler 18c for enhancing gas-liquid contact between the water W and the processing target exhaust gas F is filled between the spray nozzle 18b and the exhaust gas introduction pipe 28. Vapor may be supplied for providing moisture, instead of spraying the water W or the chemical solution.

In addition, spray nozzles 11b for spraying the water W or a chemical solution (or vapor) to the first space T1 are disposed so as to branch from a pumping pipe of the pre-stage wet scrubber 18A in the present embodiment, although the spray nozzles 11b are not necessarily needed. With this configuration, the solid components can be assuredly prevented from adhering/accumulating in the first space T1. In FIG. 1, the spray nozzles 11b are shown in a middle portion of the first space T1, but may be provided at the top surface portion 11a so as to allow the first and second spaces T1 and T2 to be washed. In addition, when moisture for thermal decomposition becomes insufficient, the spray nozzles 11b also serve to compensate for the insufficiency.

The water tank 20 is a rectangular box-shaped water tank which stores the water W or the like which is caused to flow into the reactor 12, and a drain pipe 42 is attached to the water tank 20. The water or chemical solution is stored within the water tank 20, and partition walls 20b and 20c are provided between the device main body 11, and the pre-stage wet scrubber 18A and the post-stage wet scrubber 22 such that bottom portions therebetween below the water level communicate with each other but the processing target exhaust gas F and the processed exhaust gas G passing through the interior of the water tank 20 are not mixed with each other.

The drain pipe 42 is a pipe connected to a wall surface of the water tank 20 corresponding to a reference water level position of the water tank 20, and excess water exceeding the water-storage capacity of the water tank 20 at the reference water level position is drained out of the system through the drain pipe 42. Therefore, the water level within the water tank 20 does not become higher than the reference water level position.

The post-stage wet scrubber 22 is a device which removes water-soluble components and solid components generated when the processing target exhaust gas F is thermally decomposed, from the processed exhaust gas G through water washing, and includes: a straight-tube scrubber main body 22a; a spray nozzle 22b which is disposed within the scrubber main body 22a; and a filler 22d which is installed below the spray nozzle 22b (or a plate-shaped perforated metal or screen mounted so as to entirely traverse the inner space of the scrubber main body 22a).

The post-stage wet scrubber 22 is provided upright at another end portion of the top surface portion 20a of the water tank 20, and the lower surface of the post-stage wet scrubber 22 is open toward the interior of the water tank 20, so that the water W sprayed from the spray nozzle 22b is returned to the water tank 20. A connection pipe 21 is connected to the side surface of a lower portion of the post-stage wet scrubber 22 and is also connected to a space of the water tank 20 which leads to the reactor 12. An outlet in a top portion of the post-stage wet scrubber 22 is connected to an exhaust duct (not shown) through an exhaust fan 34 for discharging the processed exhaust gas G to the atmosphere.

Next, the case where the processing target exhaust gas F is decomposed by using the exhaust gas processing device 10 shown in FIGS. 1 and 2 will be described. First, the working gas supply device is activated to supply the working gas from the storage tank to the plasma torch 14a while the flow rate of the working gas is controlled by the weight/flow rate control means.

Then, the water pump 32 is activated to supply the water W stored in the water tank 20, to the pre-stage wet scrubber 18A and the post-stage wet scrubber 22 (the first space T1 if necessary). Accordingly, the processing target exhaust gas F washed with the water by the pre-stage wet scrubber 18A flows through the exhaust gas introduction pipe 28 into the space 11c1 at the introduction port side of the annular bulge portion 11c of the device main body 11, and part of the processing target exhaust gas F moves through the heat exchanger 17 (all thereof moves through the heat exchanger 17 depending on the structure of the heat exchanger 17) to the space 11c2 at the opposite side of the introduction port 11i while being heated by heat exchange at a lower portion of the first space T1.

Since the temperature of the heat exchanger 17 portion reaches 700 to 800° C. (900° C. in some cases) as described above, a low-temperature decomposable gas component of the processing target exhaust gas F flowing with moisture into this portion is thermally decomposed to a certain extent at this portion. On the other hand, a high-temperature decomposable gas component of the processing target exhaust gas F is not decomposed here and is preheated to the atmospheric temperature.

The exhaust gas having passed through the heat exchanger 17 ascends in the first space T1 while turning around the reactor 12. During the ascent, the exhaust gas comes into contact with the fins 12f provided directly above the heat exchanger 17, and the unreacted low-temperature decomposable gas component is decomposed also at this portion. Then, the high-temperature decomposable gas component is not decomposed also here and is preheated to the atmospheric temperature similarly. Since the fins 12f are closer to the high-temperature reaction portion 12a than the heat exchanger 17, the temperature of the fins 12f is higher than that of the heat exchanger 17, and an exhaust gas component having a higher thermal decomposition temperature is decomposed while flowing between the fins 12f.

A certain amount (or most) of the low-temperature decomposable gas component of the exhaust gas F having passed through the heat exchanger 17 and the fins 12f as described above is decomposed in the first space T1, the water W (or vapor) is sprayed from the spray nozzles 11b, which are provided in the middle portion of the first space T1, to be additionally supplied to the exhaust gas F, and the exhaust gas F reaches the upper portion of the first space T1.

In the upper portion of the first space T1, the remaining part of the low-temperature thermally decomposable gas component of the processing target exhaust gas F is thermally decomposed by the heat of the electric heaters 15. The heating by the electric heaters 15 reaches 800 to 900, or 1000° C., in the upper portion of the first space T1, and most or all of the remaining low-temperature thermally decomposable gas component is thermally decomposed here in the presence of the added water W (or vapor). The high-temperature thermally decomposable gas component such as PFC is not decomposed here and is preheated and brought over to the subsequent reactor 12. In the case where the heat exchanger 17 and the fins 12f are used, the power consumption of the electric heaters 15 can be significantly reduced.

In the first space T1, the preheated high-temperature thermally decomposable gas component and an appropriate amount of moisture that has been mixed with the high-temperature thermally decomposable gas component and brought over from the first space T1 are drawn through the upper end of the reactor 12 into the reactor 12.

In the high-temperature reaction portion 12a of the reactor 12, at the same time with the emission of the atmospheric pressure plasma P, the atmospheric temperature reaches a temperature (approximately 1500° C.) at which the high-temperature thermally decomposable gas component is thermally decomposable, and the high-temperature thermally decomposable gas component is completely decomposed within the high-temperature reaction portion 12a. The thermally-decomposed exhaust gas passes as the processed exhaust gas G through the small-diameter trunk portion 12b at an increased flow rate, and flows into the high-temperature exhaust portion 12c which is a lower portion of the reactor 12. Here, in the preheated state (e.g., 800 to 900, or approximately 1000° C.) of the high-temperature decomposable gas component to be decomposed, the temperature of the high-temperature decomposable gas component is merely increased from this temperature to the temperature (approximately 1500° C.) at which the high-temperature thermally decomposable gas component is thermally decomposable. Thus, even when the flow rate of the high-temperature decomposable gas component increases from 100 liters per minute to 250 liters per minute, the capacity of the plasma generator 14 suffices to be low.

The gas heated and decomposed with the high temperature atmospheric pressure plasma P flows in the high-temperature exhaust portion 12c, and thus the high-temperature exhaust portion 12c has an atmospheric temperature of approximately 700 to 800° C. (900° C. in some cases). The cold processing target exhaust gas F flows in the high temperature atmosphere through the large number of heat-resistant pipes, which forms the heat exchanger 17, and is heated to a considerably high temperature equivalent to the atmospheric temperature, and the low-temperature thermally decomposable gas component is thermally decomposed as described above. Even if the atmospheric temperature does not reach approximately 700 to 800° C. (900° C. in some cases), the power consumption of the electric heaters 15 and the plasma generator 14 is reduced by an amount corresponding to the preheating.

Meanwhile, the processed exhaust gas G in the high-temperature exhaust portion 12c whose heat is taken by the heat exchanger 17 becomes low in temperature (e.g., 400 to 500° C.) by an amount corresponding to the taken heat, and flows into the water tank 20. Within the water tank 20, the processed exhaust gas G comes into contact with and heats the water W stored therein, and then is sent through the connection pipe 21 to the post-stage wet scrubber 22 while generating a large amount of vapor.

The processed exhaust gas G introduced to the post-stage wet scrubber 22 is washed with the water here. Thus, the solid components and the water-soluble components included in the processed exhaust gas G are adsorbed to or dissolved in the water W to be removed from the processed exhaust gas G.

In the case where the processing target exhaust gas F is of a type including a silicon compound such as monosilane, solid components such as silicon dioxide ($SiO_2$) are generated when the processing target exhaust gas F is thermally decomposed. The solid components have a property in that the solid components adhere/accumulate on the surface of the device main body 11 or the reactor 12. Thus, although not shown as described above, a spray nozzle for washing may be provided at the top surface portion 11a of the device main body 11 for washing the solid components.

At the stage previous to the exhaust fan 34 (in some cases), the exhaust gas G having passed through the post-stage wet scrubber 22 is mixed with air which is introduced from an atmosphere introduction pipe (not shown) through a breather valve (not shown), then is sent through the exhaust fan 34 to the exhaust duct, and is discharged out of the system.

In the above thermal decomposition, water vapor W formed by the high temperatures of the first and second spaces T1 and T2 further receives heat to dissociate into oxygen and hydrogen. The oxygen and hydrogen generated thus contribute to decomposition of the processing target exhaust gas F by reacting with the processing target exhaust gas F in the first and second spaces T1 and T2.

As the above-described plasma generator 14, any type of plasma generator 14 which can generate an atmospheric pressure plasma P may be used, but a "non-transferred type" plasma torch (a type of plasma torch which emits a plasma generated between electrodes, toward a desired direction) is suitably used as the plasma torch 14a of the plasma generator 14 as in the present embodiment.

When the processing target exhaust gas F was thermally decomposed by using the exhaust gas processing device 10 according to the first embodiment, an AC current required for plasma formation was set to 45 to 70 A (normally 55 to 65 A), and discharge was continuously performed. The AC current is converted to a DC current which is in turn used for plasma formation. At this time, the flow rate of nitrogen gas as the working gas became 25 to 53 L/min (liters per minute).

Under such conditions, the processing target exhaust gas F including $CF_4$ and having 200, 250, 300, and 400 L/min (liters per minute) was introduced to the pre-stage wet scrubber 18A, decomposition processing was performed, and the concentration of $CF_4$ was measured at the outlet of the exhaust fan 34. In any of the cases, a removal rate of 90% or higher was achieved.

TABLE 1

| Flow volume (L/min) | AC current value (A) | Inlet $CF_4$ concentration (ppm) | Outlet $CF_4$ concentration (ppm) | Removal rate (%) |
|---|---|---|---|---|
| 1 | 200 | 47 | 10,000 | 350 | 96 |
| 2 | 250 | 60 | 20,000 | 500 | 97 |
| 3 | 300 | 65 | 10,000 | 210 | 98 |
| 4 | 400 | 70 | 10,000 | 850 | 90 |

By introducing water as oxidizing gas to the PFC gas, the processing target exhaust gas F can be decomposed as follows:

$$CF_4+2H_2O \rightarrow CO_2+4HF \quad \text{[Chem. 1]}$$

$$2C_2F_6+6H_2O+O_2 \rightarrow 4CO_2+12HF \quad \text{[Chem. 2]}$$

$$2NF_3+3H_2O \rightarrow 6HF+NO+NO_2 \quad \text{[Chem. 3]}$$

$$SF_6+4H_2O \rightarrow H_2SO_4+6HF. \quad \text{[Chem. 4]}$$

Although the case where both the electric heaters 15 and the heat exchanger 17 are used has been described above in the first embodiment, only either of the electric heaters 15 or the heat exchanger 17 may be included. In the case where the heat exchanger 17 is used, the heat of the high-temperature processed exhaust gas G flowing down in the high-temperature exhaust portion 12c can be partially collected. Thus, in the case where the electric heaters 15 are used in combination, the capacities or power consumption of the electric heaters 15 can be reduced by an amount corresponding to the collected heat, and the energy of the plasma generator 14 can also be saved by an amount corresponding to the preheating.

In the case where the electric heaters 15 are not used, at start of operation, the exhaust gas F is not supplied and the reactor 12 and the heat exchanger 17 are heated with the atmospheric pressure plasma P for a while. Then, the exhaust gas F is supplied to start the above thermal decomposition when the temperature of the heat exchanger 17 reaches the temperature at which the low-temperature decomposable gas component of the exhaust gas F is decomposable. The energy saving effect is achieved similarly.

In the case where the electric heaters 15 are used but the heat exchanger 17 is not used, the thermal efficiency decreases due to the nonuse of the heat exchanger 17, so that it is necessary to increase the capacities or power consumption of the electric heaters 15. In any of the cases, the fins 12f provided on the high-temperature exhaust portion 12c collect the heat of the processed exhaust gas G passing through the high-temperature exhaust portion 12c, and thus are effective.

The case where the exhaust gas F is composed of the low/high-temperature decomposable gas components has been mainly described above. However, also in the case where the exhaust gas F is composed of only a high-temperature decomposable gas component, similarly, even when the amount of the high-temperature decomposable gas component significantly increases, the capacity of the plasma generator 14 can be saved at least by an amount corresponding to preheating by the electric heaters 15 or the heat exchanger 17, and it is possible to handle PFC having a large flow volume with the plasma generator 14 having a small capacity. This point is the same also in the following embodiments.

Figure 3:
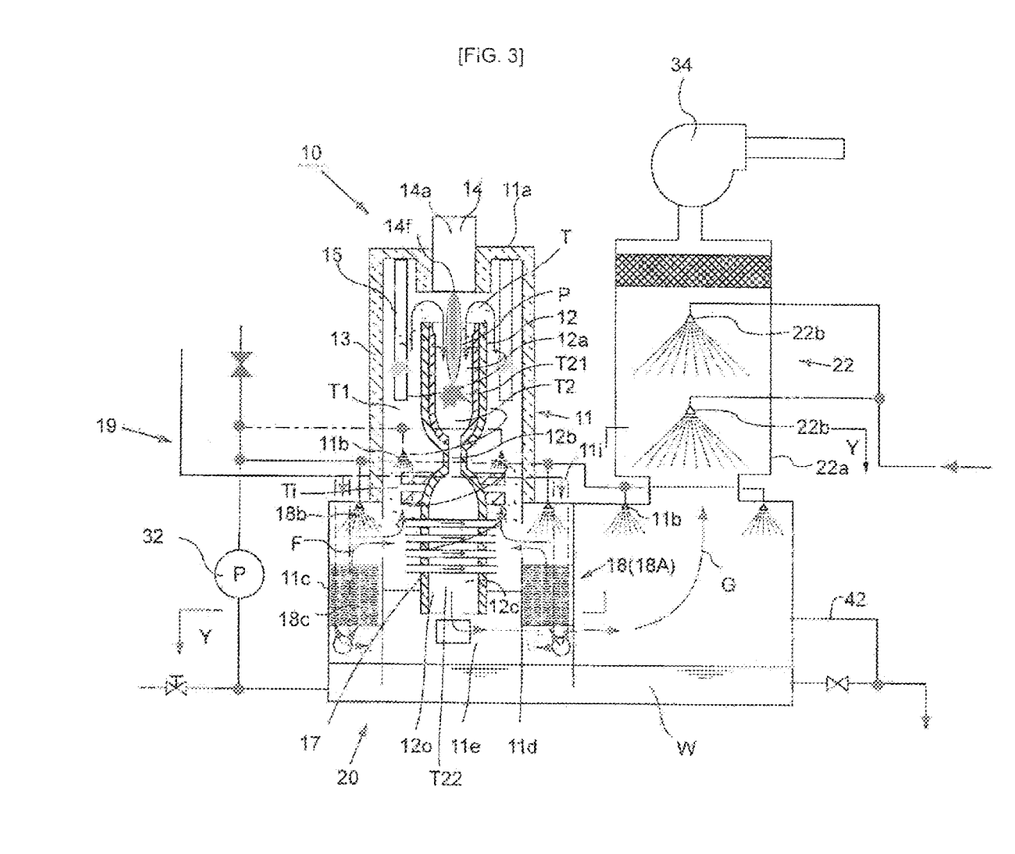
FIG. 3 is a configuration diagram showing an exhaust gas processing device of a second embodiment of the present invention.
Figure 4:
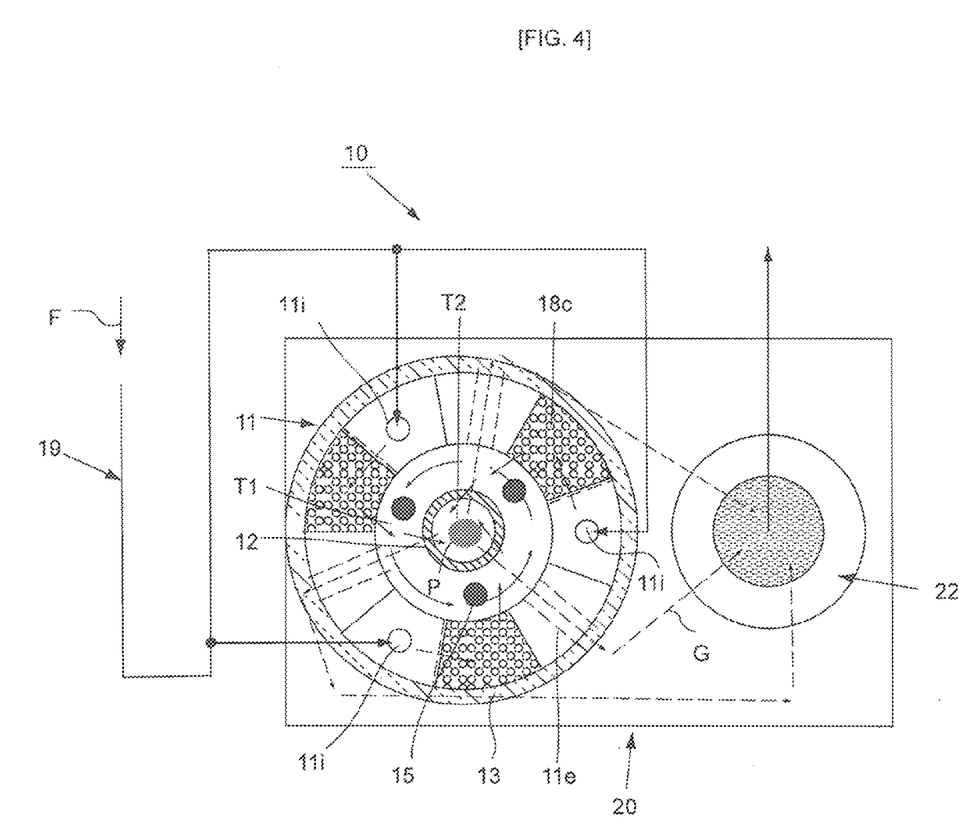
FIG. 4 is a cross-sectional view taken along arrow Y-Y in FIG. 3 and is a configuration diagram showing an exhaust gas processing device of another embodiment (spray type water supply) of the present invention.
Figure 5:
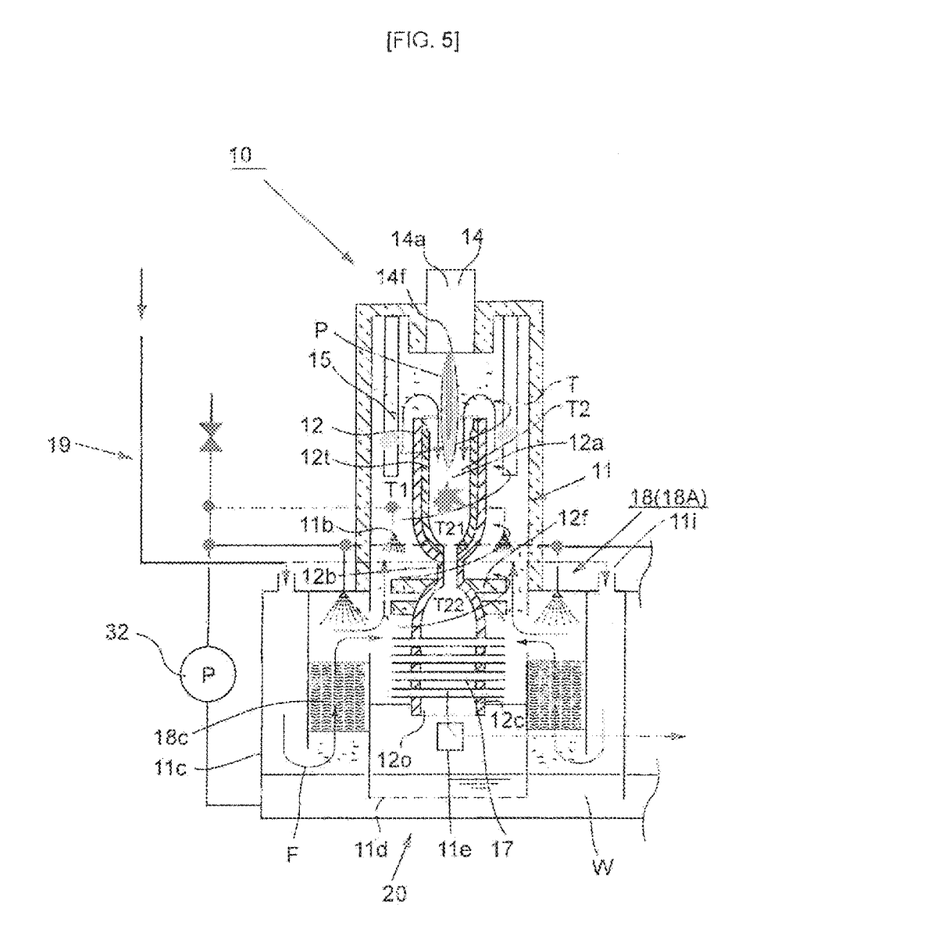
FIG. 5 is a configuration diagram showing an exhaust gas processing device of a second embodiment of the present invention.

Next, the second embodiment related to the present invention will be described with reference to FIGS. 3 to 5. For easy understanding of the positional relationship between a space in which each introduction port 11i in FIG. 3 is formed and a space which is adjacent to this space and in which the filler 18c is filled, FIG. 5 shows that these spaces are aligned on the same plane, and these spaces are the same. Also in the second embodiment and a third embodiment (FIG. 6), an example in which the electric heaters 15 and the heat exchanger 17 are used in combination is shown. However, only either of the electric heaters 15 or the heat exchanger 17 may be included similarly to the first embodiment. In addition, the fins 12f may also not be used, but when the fins 12f are used, the thermal efficiency improves accordingly.

In the second embodiment, the pre-stage wet scrubber 18A is housed within the annular bulge portion 11c of the device main body 11 and is downsized as compared to the above-described first embodiment. The entire periphery of a lower end portion of a cylindrical partition wall 11d surrounding a lower portion of the reactor 12 is immersed in the water tank 20. Thus, a communication opening 11e for allowing the processed exhaust gas G to flow to the post-stage wet scrubber 22 is bored in the partition wall 11d.

As is seen from FIG. 4, the annular bulge portion 11c is divided into three sections, the processing target exhaust gas F is introduced to each space in which the introduction port 11i is formed, passes through the filler 18c within each adjacent space from below, gathers at an inlet portion Ti which is open in a ring shape around the reactor 12 in the first space T1, and reaches the first space T1. Heat exchange is the same as in the first embodiment. The spray nozzle 18*b* is installed above each space in which the filler 18*c* is filled. The other portion is the same as in the first embodiment. The annular bulge portion 11*c* is divided into multiple sections, and the introduction ports 11*i* whose number is equal to the number of the multiple sections are also present. Thus, a plurality of production facilities can be connected to the single device 10.

Figure 6:
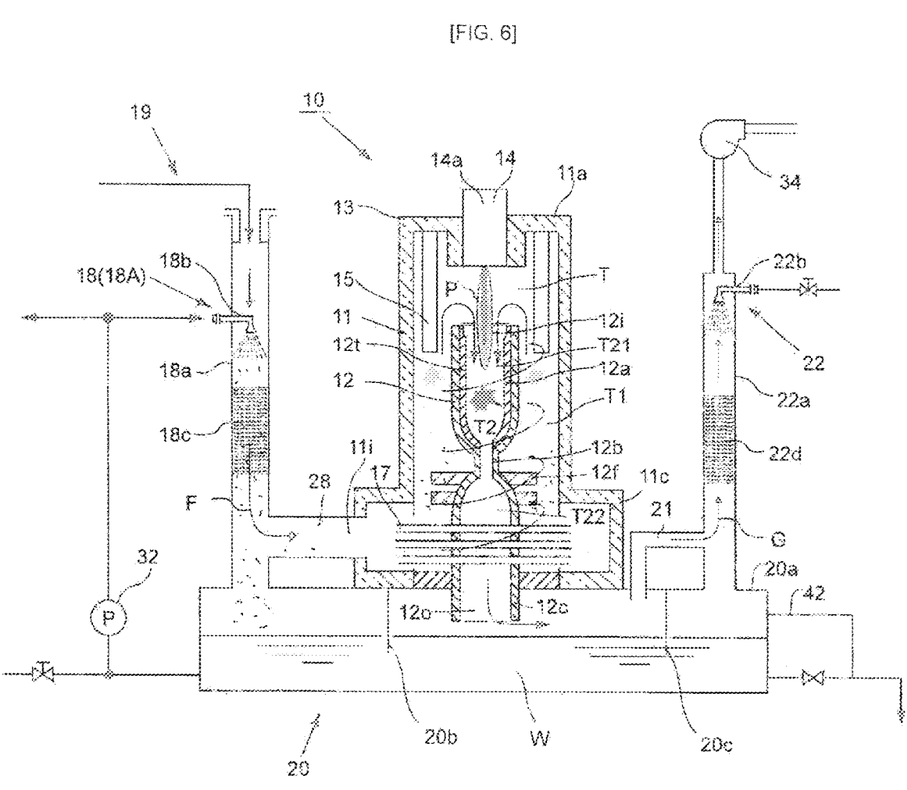
FIG. 6 is a configuration diagram showing an exhaust gas processing device of a third embodiment of the present invention.

In the third embodiment, the reactor 12 has a heat exchange function as shown in FIG. 6. The reactor 12 is produced from, for example, thick-walled cast iron, and the exhaust gas F ascending spirally in the first space T1 is brought into contact with and heated by the reactor 12, whereby the accompanying water is made into water vapor. The other is the same as in the first embodiment. In this case, the thick-walled reactor 12 has the function of a heat exchanger.

Figure 7:
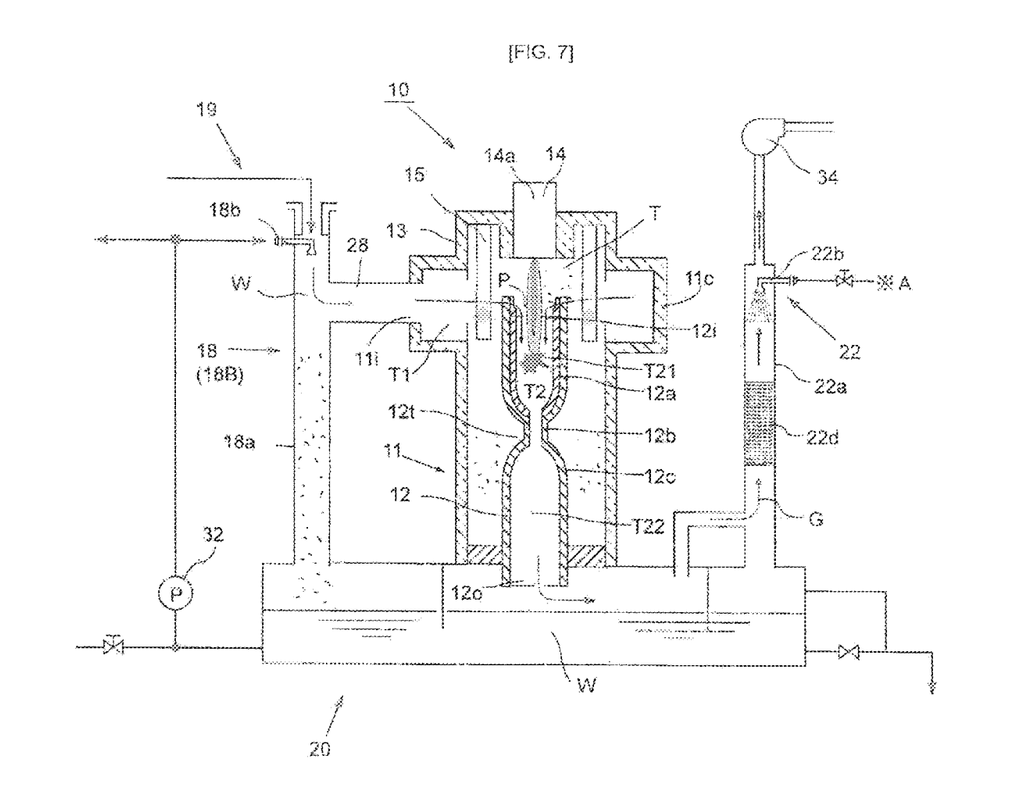
FIG. 7 is a configuration diagram showing an exhaust gas processing device of a fourth embodiment of the present invention.

In a fourth embodiment related to the present invention, as shown in FIG. 7, the exhaust gas F is introduced to the annular bulge portion 11*c* which is an upper portion of the device main body 11, and is revolved here to come into contact with the electric heaters 15. Therefore, although the position of the annular bulge portion 11*c* is different from that in the above embodiments, the annular bulge portion 11*c* serves as a passage before contact with the electric heaters 15, and thus the interior of the annular bulge portion 11*c* is the first space T1. The other is the same as in the above-described embodiments. In this case, a water vapor supply unit 18B for supplying water vapor instead of water is installed as the moisture supply unit 18. In the fourth embodiment, the exhaust gas F is supplied through the upper portion of the device main body 11, and thus a heat exchanger cannot be used.

REFERENCE SIGNS LIST

F processing target exhaust gas
G processed exhaust gas
P atmospheric pressure plasma
W moisture (water or water vapor)
T heating decomposition chamber
T1 first space
T21 high-temperature reaction space
T22 high-temperature exhaust space
Ti inlet portion of first space
T2 second space
10 exhaust gas processing device
11 device main body
11*a* top surface portion
11*b* spray nozzle
11*c* annular bulge portion
11*c*1 space at introduction port side
11*c*2 space at side opposite to introduction port
11*d* partition wall
11*i* introduction port
11*e* communication opening
11*k* partition wall
12 reactor
12*a* high-temperature reaction portion
12*b* small-diameter trunk portion
12*c* high-temperature exhaust portion
12*f* fin
12*i* upper end opening
12*o* discharge port
12*t* refractory material
13 heat insulator
14 plasma generator
14*a* plasma torch
14*f* plasma emission port
15 electric heater
17 heat exchanger
18 (18A) moisture supply unit (pre-stage wet scrubber)
18 (18B) moisture supply unit (vapor supply device)
18*a* scrubber main body
18*b* spray nozzle
18*c* filler
19 exhaust gas duct
20 water tank
20*a* top surface portion
20*b*, 20*c* partition wall
21 connection pipe
22 post-stage wet scrubber
22*a* scrubber main body
22*b* spray nozzle
22*d* filler
28 exhaust gas introduction pipe
32 water pump
34 exhaust fan
42 drain pipe

The invention claimed is:

1. An exhaust gas processing device comprising:
a device main body having a heating decomposition chamber therein;
a non-transferred type plasma generator installed at a top surface portion of the device main body;
a tubular reactor installed within the device main body such that an upper end opening thereof is directed toward a plasma emission port of the plasma generator, the reactor having therein a second space in which a high-temperature decomposable gas component of a processing target exhaust gas is thermally decomposed with an atmospheric pressure plasma from the plasma generator, the reactor having a cylindrical shape whose both end surfaces are open, and includes a center portion which is narrowed and is a small-diameter trunk portion at a center thereof, a high-temperature reaction portion above the small-diameter trunk portion at the center, and a high-temperature exhaust portion below the small-diameter trunk portion at the center;
a moisture supply nozzle provided at an inlet side of the device main body and configured to supply moisture to the heating decomposition chamber; and
a heater for heating the processing target exhaust gas including at least one of an electric heater disposed in a first space which is between an inner peripheral surface of the device main body and an outer peripheral surface of the reactor and into which the processing target exhaust gas is supplied, and a heat exchanger provided at the high-temperature exhaust portion of the reactor and configured to transfer heat in the second space to the first space.

2. The exhaust gas processing device according to claim 1, wherein the moisture supply nozzle is disposed in a pre-stage wet scrubber provided at the inlet side of the device main body and configured to wash the processing target exhaust gas with water.

3. The exhaust gas processing device according to claim 1, wherein the moisture supply nozzle is a vapor supply device provided at the inlet side of the device main body and configured to supply vapor to the device main body.

4. The exhaust gas processing device according to claim 1, wherein a fin for dissipating heat of the reactor in the first space is provided on the outer peripheral surface of the reactor.

5. The exhaust gas processing device according to claim 1, further comprising a post-stage wet scrubber configured to wash the processed exhaust gas discharged from the reactor, with water.

6. The exhaust gas processing device according to claim 1, wherein a diameter of a section of the high-temperature reaction portion and a diameter of a section of the high-temperature exhaust portion are both greater than the small-diameter trunk portion at the center.

* * * * *